United States Patent [19]
Christ

[11] Patent Number: 4,620,414
[45] Date of Patent: Nov. 4, 1986

[54] GAS TURBINE ENGINE

[76] Inventor: Dieter Christ, Hinter der Altdörfer Kirche 30, D-6113 Babenhausen 1, Fed. Rep. of Germany

[21] Appl. No.: 701,363

[22] Filed: Feb. 13, 1985

[51] Int. Cl.[4] .............................................. F02C 3/16
[52] U.S. Cl. ................................. 60/39.34; 60/39.75
[58] Field of Search ............... 60/39.34, 39.38, 39.39, 60/39.44, 39.75, 39.76, 39.78, 39.17, 39.35; 415/80, 83, 92, 65

[56] References Cited

U.S. PATENT DOCUMENTS

| | | | |
|---|---|---|---|
| 1,077,314 | 11/1913 | Stern | 60/39.38 |
| 1,306,388 | 6/1919 | Osborne | 60/39.34 |
| 3,635,576 | 1/1972 | Wieckmann | 415/65 |

FOREIGN PATENT DOCUMENTS

| | | |
|---|---|---|
| 625694 | 1/1936 | Fed. Rep. of Germany . |
| 2046632 | 3/1972 | Fed. Rep. of Germany . |
| 466140 | 5/1914 | France . |
| 571128 | 5/1924 | France . |
| 70498 | 12/1914 | Switzerland . |
| 20497 | of 1915 | United Kingdom ............... 60/39.34 |

Primary Examiner—Louis J. Casaregola
Attorney, Agent, or Firm—Michael J. Striker

[57] ABSTRACT

A gas turbine engine with intermittent combustion which has at least two circular discs which are received in a housing rotatably and concentric with respect to a drive shaft. At least one partial combustion chamber is shaped in each disc. The partial combustion chambers discharge at the front faces of the discs and have to be positioned during the rotation of the discs in such a manner that a complete combustion chamber is formed extending through all discs. A deflection is designed in the partial combustion chambers. This deflection is in the opposite direction in the adjacent discs. The discs are coupled with the drive shaft in such a manner that the adjacent discs rotate in the opposite direction corresponding to the alignment of the deflection in the partial combustion chambers, but act in a uniform driving manner on the drive shaft. Thus, a compact structure of the engine is obtained which has a high degree of quiet operation while simultaneously having a comparable low wear.

5 Claims, 6 Drawing Figures

GAS TURBINE ENGINE

BACKGROUND OF THE INVENTION

The invention is based on the field of internal combustion engines. The invention relates to a drive unit with a gas turbine with an intermittent comustion, that is, with a noncontinous combustion. The invention relates in particular to gas turbine engines for driving of vehicles and airplanes.

A gas turbine is known from FR-PS No. 466,140. More than two discs adjacent to each other and concentrical with respect to a drive shaft are provided in a turbine housing in this gas turbine. The discs are provided with partial combustion chambers. During rotation of the rotatable discs the partial combustion chambers come into alignment with each other and form a complete combustion chamber. A portion of the discs are fixedly connected with the housing, while another portion of the discs are fixedly connected with the drive shaft. Therefore, the operation which is carried out by the expansion of the combustion gases is transmitted only by the rotatable discs to the drive shaft. Thereby, the nonrotatable discs absorb reaction forces which have to be transferred to the outside and must be absorbed and compensated on the outside. This does not permit the use of such gas turbines in vehicles.

An explosion turbine is also known from (CH-PS No. 70 498). This turbine is provided with two wheels or two discs. One of the discs is fixedly mounted on the drive shaft. The other disc is loosely mounted on the drive shaft and is connected with the first disc by means of a reverse gear.

SUMMARY OF THE INVENTION

It is an object of the invention to provide an improved gas turbine engine.

It is a further object of the invention to provide a compact gas turbine engine with a space saving mode of construction.

It is a further object of the invention to provide a gas turbine engine wherein the dynamical forces generated within the engine are already substantially compensated within the engine.

These and other objects are obtained by means of a gas turbine engine with intermittent combustion which is provided with the following features:

At least two circular discs are provided in a housing which are rotatable and concentric with respect to a drive shaft; the drive shaft extends from the housing with at least one shaft end; the first and the last discs are tightly engaging the adjacent housing wall with their outer front faces; the housing wall which is adjacent to the first disc is provided with inlet openings for supplying an air-fuel-mixture or air and fuel as well as, if need be, an ignition device; the housing wall which is adjacent to the last disc is provided with outlet openings for combustion gases; the discs are connected with the drive shaft in such a manner that adjacent discs are rotatable counterclockwise, at least a first partial combustion chamber is provided in the circumferential area of the first disc, preferably a plurality of first partial combustion chambers are distributed over the circumference thereof; the first partial combustion chambers are provided with an inlet on the disc side facing the housing wall which is periodically connected with a compressor; the first partial combustion chambers have an outlet on the disc side facing the second disc; this outlet is disposed in an inclined position in rotating direction of the second disc; the same number of further partial combustion chambers are provided on the discs following the first disc, the inlet in the further partial combustion chambers is always adapted to the outlet of the partial combustion chamber of the preceding disc, so that during the rotation of the discs the inlet and outlet of the partial combustion chambers are always flush with each other for forming a complete combustion chamber extending through all discs; the outlet of these further partial combustion elements is always located on the disc side which is opposite the inlet and the outlet is always inclined against the rotating direction of the disc; a deflection occurs within the discs between the inlet and the outlet of the first and also the further partial combustion elements, whereby the deflection in partial combustion chambers of adjacent discs is in the opposite direction; the outlets of the partial combustion chambers in the last disc are in a periodic connection with the outlet openings in the adjacent housing wall during the rotation of the last disc; the relative movements of the discs with respect to each other and with respect to the housing are so coordinated that the first partial combustion chambers are closed on the inlet side during the injection phase, while the last partial combustion chambers are closed at the outlet side, that the first partial combustion chambers and the last partial combustion chambers are in connection with each other and that the outlet of the last partial combustion chambers are opened while the first and the last partial combustion chambers are still in connection with each other.

In this gas turbine engine in accordance with the invention the absolute rotational speed of the individual discs must be only half of the dimension for obtaining the same output. Since the discs can rotate with a lower rotational speed one can count on a reduced wear and high life expectancy of the engine with respect to a certain operating time of the gas turbine engine. The more universal useability of the gas turbine engine in accordance with the invention is also advantageous.

A further embodiment of the gas turbine engine in accordance with the invention consists in that the discs are designed as inner toothed wheels and are coupled with the drive shaft directly or by means of a drive. Since adjacent discs move in opposite direction of the rotation caused by the corresponding shaping of the partial combustion chambers it is required that the number of the rims on adjacent discs differ by an uneven number in case that the discs run over toothed wheels which are mounted in a number of rims and are coupled with the drive shaft. Thereby, the torque of the discs which rotate in alternating directions is transmitted in a uniform manner to the drive shaft with a corresponding step up or step down gear.

A further embodiment of the gas turbine engine consists in that the number of the inlet openings in the inlet side housing wall and the number of the outlet openings in the outlet side housing wall is equal to the number of the partial combustion chambers per discs.

A further embodiment of the gas turbine engine in accordance with the invention consists in that the deflection between the inlet and the outlet of the partial combustion chambers within a disc is 90°.

Finally, a further embodiment of the gas turbine engine in accordance with the invention consists in that the discs are mounted circumferentially in the housing;

a stable and low wear circular movement of the discs in the housing are provided by mounting the circular discs in the area of the disc circumference. Thus, undesirable stresses on the shaft and its bearings are essentially avoided.

DETAILED DESCRIPTION OF A PREFERRED EMBODIMENT

FIGS. 1 to 5 illustrate a gas turbine engine. Two discs 2a,2b are concentrically inserted with respect to a drive shaft penetrating housing 1 in the multipart housing 1 of the drive engine. At the point of their circumference, that is, at the circumference of the discs the two discs 2a,2b are guided in a bearing 9. This bearing 9 is provided with balls 9' and a bearing lubricator 10. The first disc 2b seen from the left in FIG. 1 engages tightly on a lid like housing wall 1' with its outer front face and the second or last disc 2a which is disposed adjacent on the right side engages the inner housing wall 1" with its outer front face. The inlet side housing wall 1' is provided with at least one inlet 12 for the supply of an air-fuel-mixture or air, an ignition device 7 and a fuel injection device 11. The inlet 12 is periodically in connection with a compressor which is not illustrated in FIGS. 1 to 5. The housing plate 1" is provided with at least one outlet 8. A propeller 14 with blades 13 is provided outside of the inner housing wall 1". In an analog manner this propeller is in operating connection with drive shaft 3 like discs 2a and 2b.

A first partial combustion chamber 5b is shaped in the first disc 2b. A second or last partial combustion chamber 5a is shaped in the second or last disc 2a. Both partial combustion chambers 5a,5b form a complete combustion chamber in the arrangement illustrated in FIG. 1, extending through both discs 2a,2b. The combustion chamber, as illustrated, is closed on the inlet side, that is, at the inlet opening 5b' of the partial combustion chamber 5b by a housing wall 1' and at the outlet side, that is, at the outlet opening 5a" by a housing wall 1". Each of the partial combustion chambers 5a,5b has the shape of a conduit or hose which is ordinarily curved or deflected around its longitudinal axis by an angle of about 90° approximately in the center of a disc. The diameter of the conduit or hose is not constant but tapers to the outside. In the second or last disc 2b the conduit diameter tapers toward the inlet opening 5b' and in the outlet side disc toward the outlet opening 5a". Both partial combustion chambers 5a,5b have about the same shape, whereby they result in a 180° rotation symmetric structure (see FIG. 1) when they are in a flush position with respect to each other.

Figure 2:
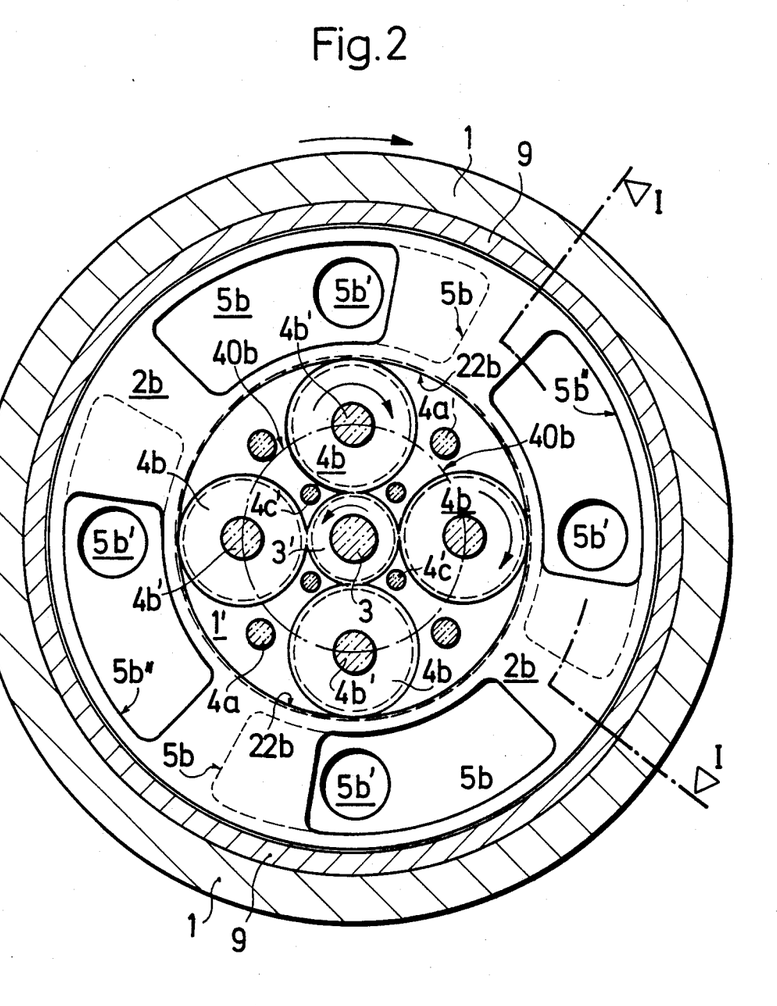
FIG. 2 is a sectional view along line II—II of FIG. 1.
Figure 3:
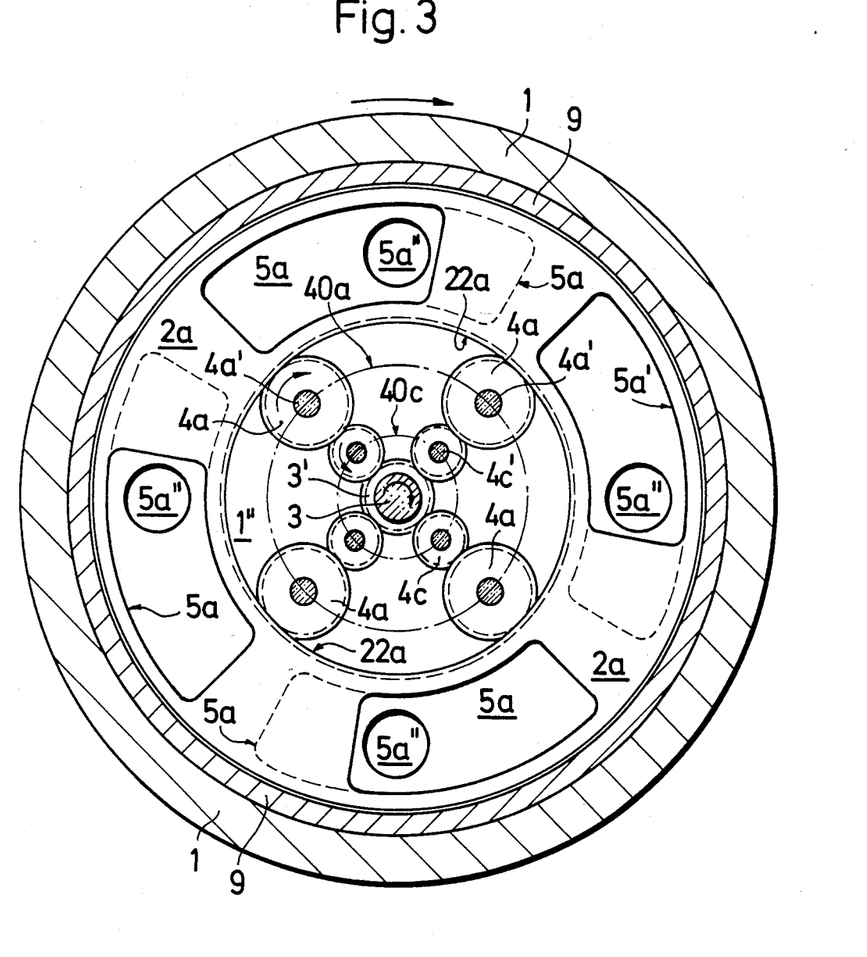
FIG. 3 is a section along line III—III of FIG. 1.
Figure 5:
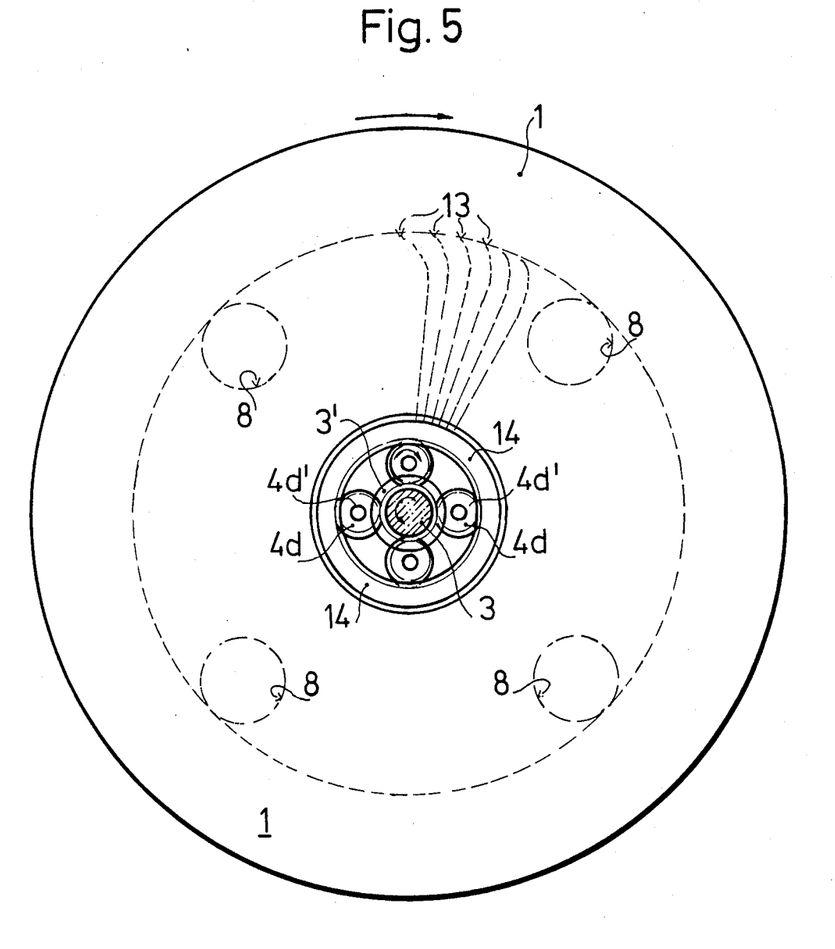
FIG. 5 is a section along line V—V in FIG. 1.

The coupling of disc 2b with drive shaft 3 is illustrated in FIG. 2, the coupling of disc 2a with drive shaft 3 in FIG. 3 and the coupling of the propeller 4 with the drive shaft 3 in FIG. 5. In FIG. 2 the disc 2b is illustrated with a view to the outlet side front face as an inner toothed hollow wheel or annular disc. Four partial combustion chambers 5b are illustrated being distributed over the circumference in the annular range of disc 2b. Each of the partial combustion chambers has an annular limited inlet opening 5b' and a trapezoidal limited outlet opening 5b". The inner tooth arrangement 22b of the annular disc 2b is coupled with an outer tooth arrangement 3' of the drive shaft 3 by means of four gear wheels 4b. These gear wheels 4b are mounted in housing walls 1'. The bearing axes 4b' of the gear wheels 4b are arranged on a circle or rim 40b. By an intermediary switching of the rim 40b of gear wheels 4b it is achieved that the rotating direction of disc 2b is directed opposite to the rotating direction of shaft 3.

In FIG. 3, the disc 2a is illustrated with a view to the inlet side front face as a hollow wheel or annular disc. Four partial combustion chambers 5a are provided and distributed over the circumference in the annular range. Each of the partial combustion chambers 5a is provided with a trapezoidally limited inlet opening 5a' and an annular limited outlet opening 5a". The inner tooth arrangement 22a of disc 2a is connected with the drive shaft 3 by means of gear wheels 4a and 4c as well as by means of the outer gear arrangement 3'. The gear wheels 4a,4c are disposed in two concentric circles or rims 40c.

The gear wheels 4a which are distributed over the circumference of rim 40a are mounted in the housing walls or plates 1',1" by means of axles 4a'. The gear wheels 4c which are distributed over the circumference of rim 40c are mounted in the aforementioned housing walls 1',1" by means of axles 4c'. By an intermediary switching of two rims of gear wheels between the inner tooth arrangement 22a and drive shaft 3 which is provided with the outer tooth arrangement 3' it is achieved that the rotating direction of disc 2a is the same as the rotating direction of drive shaft 3.

Figure 4:
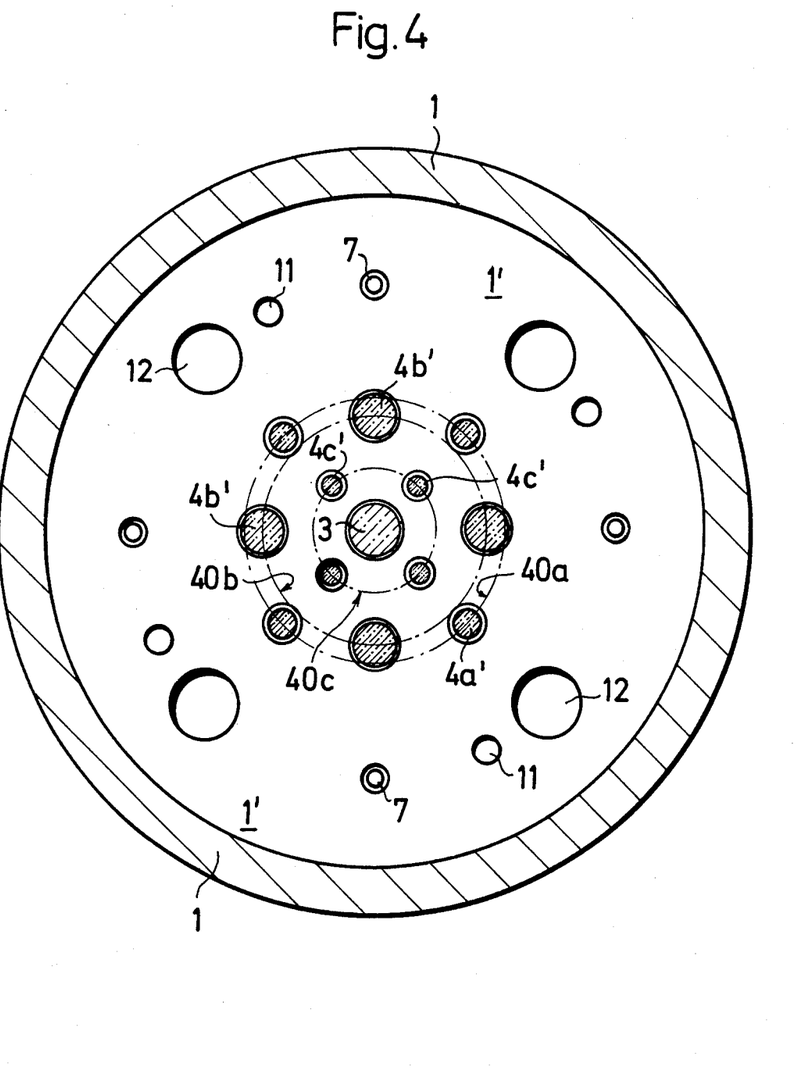
FIG. 4 is a section along line IV—IV of FIG. 1.

FIG. 4 illustrates the housing wall 1' with a view of the front face facing the first disc 2b. Distributed over the circumference are four inlets 12, four fuel injection devices 11 as well as four ignition devices 7. Three rims 40c, 40a, 40b are concentrically disposed around the drive shaft 3 which is illustrated in a cross section. Four bearing locations are distributed over the circumference on each of the rims for the bearing axles 4a', 4b', 4c' which are shown in a cross section.

The coupling of the propeller wheel 14 with the drive shaft 3 is the same and in an analog manner as the first disc 2b with drive shaft 3 and can be seen from FIG. 5. The propeller wheel 14 is provided with an inner tooth arrangement 23 and is connected with this inner tooth arrangement 23 by means of gear wheels 4d with an outer gear arrangement 3' of the drive shaft 3. The gear wheels 4d are mounted in housing 1 by means of bearing axles 4d'. Since the inner tooth arrangement 23 is coupled with the drive shaft 3 by means of a rim gear wheels 4d with the outer gear of the drive shaft, the rotating direction of the propeller wheel 14 is always opposite that of shaft 3.

Figure 1:
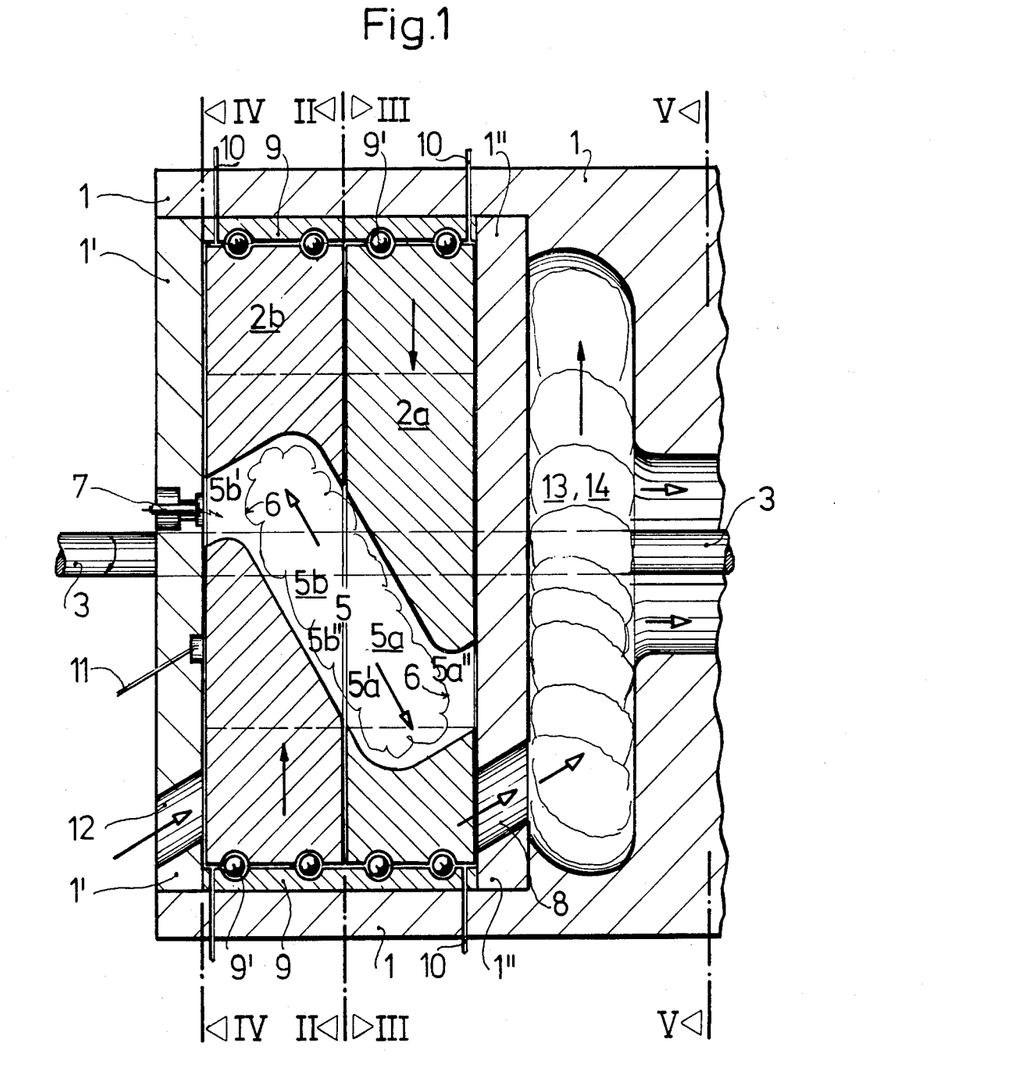
FIG. 1 is a sectional view of the gas turbine engine in accordance with the invention along line I—I in FIG. 2 with an illustration of a combustion chamber at a point of ignition.

The mode of operation of the gas turbine engine will now be explained in conjunction with the combustion chamber illustrated in FIG. 1. An excess pressure is generated within the combustion chamber 5 when combusting a fuel-air-mixture 6. This excess pressure is only reduced when the last disc 2a with its associated partial combustion chamber 5a moves from its position in FIG. 1 by a downward movement (see arrow to disc 2a), so that the outlet opening 5a" is in connection with the outlet opening 8. Thereby, despite the countermovement of the first disc 2b a connection is still maintained at this movement by the two parts of the combustion chamber 5a,5b by overlapping of the trapezoidal limited outlet 5b" and the trapezoidal limited inlet 5a'. This is required so as to be able to emit the combustion gases which are present in the first partial combustion chamber 5b to the outside through outlet opening 8. A force is exerted on each of the two discs 2a,2b at the moment when the combustion gases discharge because of the high pressure in the combustion chamber from which the combustion gases discharge with a high speed. Thereby, the force on disc 2a is directed opposite to the force of disc 2b. Thereby, the first disc 2b is rotated upwardly as seen in FIG. 1 (see arrow on disc 2b) and the second or last disc 2a is rotated downwardly. The force which is generated or the torgue is transmitted from the discs to the drive shaft, as can be seen from FIGS. 2 to 4.

The position of the inlet opening 12 in housing wall 1' is chosen in such a manner that the inlet 5b' of the first partial combustion chamber 5b in flush with the inlet opening 12 during the rotating movement of the first disc 2b. This occurs before the inlet 5b passes the fuel injection device 11 and the ignition device 7. Thereby, the first partial combustion chamber 5b is admitted with air by means of a compressor or charger which is not shown here. So that both partial combustion chambers 5a,5b can be charged it is required that the two partial combustion chambers 5a,5b overlap at least partially with the openings 5b" and 5a" during the admittance through the inlet opening 12, so that air can enter also into the second or last partial combustion chamber 5a.

The combustion gases flow from the combustion chambers through outlet openings 8 at a right angle to blades 13 of the successively switched peopeller 14. Thereby, the energy of the combustion gases which discharge with a high speed may be used for the driving power of the engine. Simultaneously, the speed of the combustion gases are reduced. Consequently, a substantial reduction of the noise level of the discharging gases is provided. The gases which flow out of the outlet openings 8 cause the propeller 14 to rotate. The torque is transmitted to the drive shaft 3 by the gear coupling between propeller 14 and the drive shaft. Thus, an improvement of the degree of efficiency is obtained, while simultaneously obtaining a substantial reduction of the speed of the combustion gases which are released from the outlet openings 8.

For illustration purposes for the path of the fuel-air-mixture within the gas turbine engine arrows with triangular heads are entered in FIG. 1 which show the flow direction of the mixture which is not yet combusted or is already combusted. The arrows with the black designed triangular heads indicate coutermoving directions of the two discs 2a,2b as well as of the propeller 14.

Figure 6:
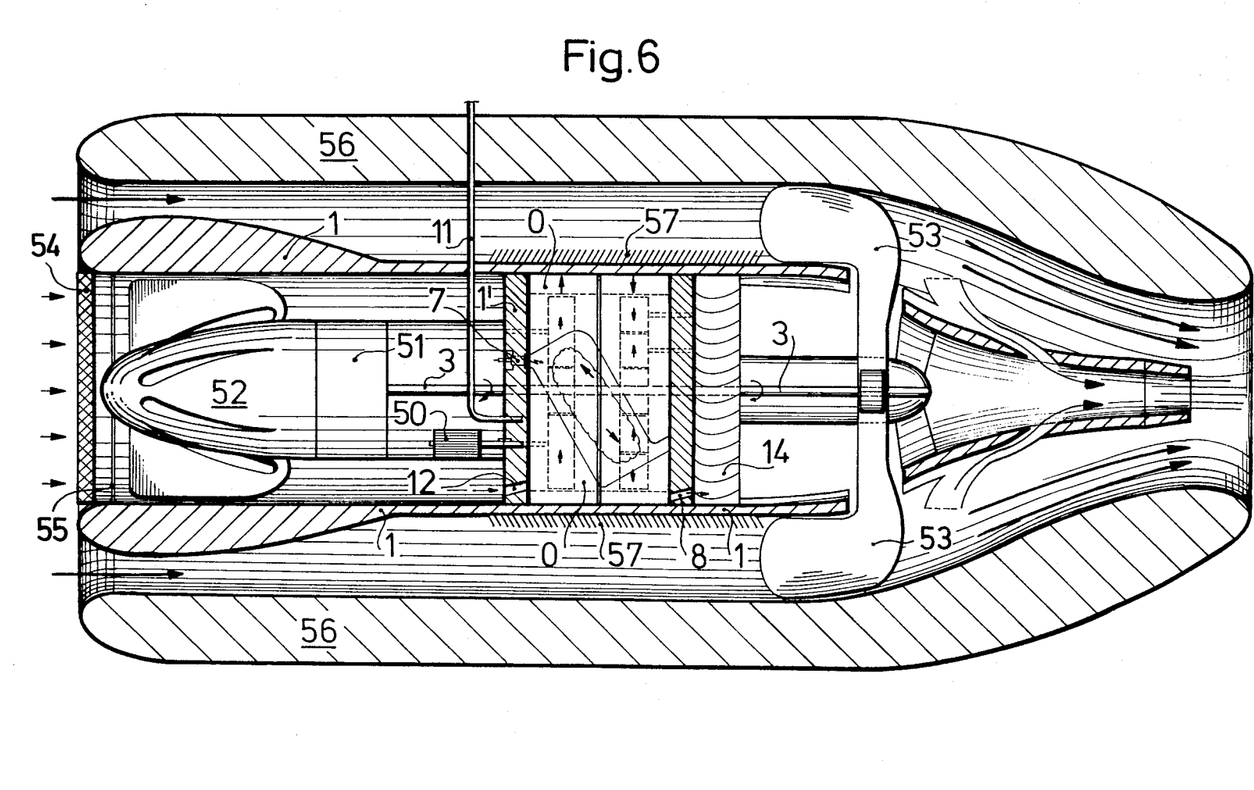
FIG. 6 is a longitudinal section through a two circuit jet engine with a gas turbine engine in accordance with FIGS. 1 to 5.

FIG. 6 shows in a principal manner a drive unit into which a gas turbine engine O is integrated as shown in FIGS. 1 to 5. This is a two circuit jet engine with an outer air feeding and an inner air feeding to the gas turbine. Seen from left in FIG. 6 at the inlet side housing wall 1' of the gas turbine engine O is a starter 50 for the automatic starting of the engine. The shaft of the starter 50 is fed through housing plate 1' and acts on the adjacent first disc. Looking at the left of FIG. 6, the drive shaft 3 which penetrates the gas turbine engine O is coupled with a compressor, namely a screw loader 52 by means of a drive 51. Looking at the right area in FIG. 6, the drive shaft 3 is coupled with adjustable blades 53. An air filter 54 and an iris locking means 55 is provided in the area of the inlet of the compressor 52. The housing 1 of the turbine engine O also encompasses the compressor 52 as well as the air filter 54 and the locking means 55 switched in front of the compressor. Housing 1 is mounted concentrically in a tube like housing 56. An intermediate space remains between the inner wall of housing 56 and the outer wall of housing 1. This intermediary space represents an annular like flow conduit which reduces on the outlet side, looking to the right in FIG. 6. On the outside of housing 1 in the area of the gas turbine engine O cooling ribs 57 are provided in the flow conduit. The adjustable blades 53 of a turbopropeller move in this flow conduit, whereby the center area of the turbopropeller is admitted by the combustion gases which had been ejected from the gas turbine engine O and which have passed propeller 14.

The first disc in the gas turbine engine acts as a reaction pressure turbine. The second disc acts as a reaction turbine, whereby the flow energy of the combustion gases is directly converted into rotation energy like in a turbine rotor.

I claim:
1. A gas turbine engine comprising a housing having two opposing end walls; at least two rotatable circular discs concentrically arranged on a drive shaft and being tightly adjacent to each other, transmission means interconnecting said discs and drive shaft such that said discs are rotatable in counter directions and are adapted to drive the drive shaft in the same direction, each disc tightly engaging an adjacent one of said end walls at an end face thereof; ignition means; an end wall adjacent to a first of said discs having at least one inlet opening periodically connected with a compressor and fuel supply means for supplying an air-fuel mixture, an end wall adjacent to a second disc having at least one outlet opening for combustion gases; said first disc being formed with a plurality of first partial combustion chambers arranged over a circumference of the first disc and each having an inlet and an outlet, the outlet being provided at a side of the first disc facing the second disc and inclined in a direction of rotation of the second disc; said second disc being formed with a plurality of second partial combustion chambers arranged over a circumference of the second disc and each having an inlet adapted to and communicating with an outlet of one of said first partial combustion chambers so that upon rotation of said discs, the inlet of a respective second partial combustion chamber can be aligned flush with the outlet of a respective first partial combustion chamber, each outlet of each second partial combustion chamber being inclined in a direction opposite to the direction of rotation of the second disc and being arranged at a side of the disc opposite to that at which the inlet of the second partial combustion chamber is located so that a deflection occurs within each disc between each inlet and each outlet of each partial combustion chamber and such a deflection in the first disc is opposite to the deflection in the second disc; said first and second partial combustion chambers being in connection with each other and forming a common combustion chambers enclosed at two sides thereof by said end walls, the outlets of said second partial combustion chambers being in a periodic connection with said outlet opening during the rotation of said second disc.

2. Gas turbine engine in accordance with claim 1, wherein the discs are formed as inner toothed wheels and are coupled with the drive shaft by toothed gear wheels.

3. Gas turbine in accordance with claim 1, wherein the number of the inlet openings at an inlet side housing wall and the number of the outlet openings at an outlet side housing wall are equal to the number of the partial combustion chambers in each disc.

4. Gas turbine engine in accordance with claim 1 wherein the deflection between each inlet and each outlet in each partial combustion chamber is 90 degrees.

5. Gas turbine engine in accordance with claim 1, wherein the discs are supported with their circumferential walls in the housing.

* * * * *